(12) United States Patent
Islam

(10) Patent No.: US 9,618,718 B2
(45) Date of Patent: Apr. 11, 2017

(54) UNIVERSAL REMOTE RADIO UNIT BIRD ARMORED FIBER OPTIC CABLE ASSEMBLY

(71) Applicant: CommScope Technologies LLC, Hickory, NC (US)

(72) Inventor: Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 232 days.

(21) Appl. No.: 14/611,373

(22) Filed: Feb. 2, 2015

(65) Prior Publication Data

US 2015/0168657 A1 Jun. 18, 2015

Related U.S. Application Data

(63) Continuation-in-part of application No. 13/794,939, filed on Mar. 12, 2013, now Pat. No. 8,948,557, which is a continuation-in-part of application No. 13/791,248, filed on Mar. 8, 2013.

(60) Provisional application No. 61/660,345, filed on Jun. 15, 2012, provisional application No. 61/728,020, filed on Nov. 19, 2012.

(51) Int. Cl.
*G02B 6/44* (2006.01)
(52) U.S. Cl.
CPC ........... *G02B 6/4416* (2013.01); *G02B 6/443* (2013.01); *G02B 6/4429* (2013.01); *G02B 6/4471* (2013.01); *G02B 6/4472* (2013.01); *Y10T 29/49174* (2015.01); *Y10T 29/49826* (2015.01)

(58) Field of Classification Search
CPC .............................. G02B 6/4429; G02B 6/443
USPC .................................................. 385/107, 108
See application file for complete search history.

(56) References Cited

U.S. PATENT DOCUMENTS

| | | | |
|---|---|---|---|
| 4,373,777 A | 2/1983 | Borsuk et al. | |
| 5,473,718 A | 12/1995 | Sommer | |
| 5,590,230 A | 12/1996 | Cheng | |
| 5,649,042 A | 7/1997 | Saito | |
| RE37,028 E * | 1/2001 | Cooke .................. | G02B 6/3889 385/112 |
| 6,326,550 B1 | 12/2001 | Dyer et al. | |
| 6,438,299 B1 | 8/2002 | Brown et al. | |
| 6,738,555 B1 | 5/2004 | Cooke et al. | |
| 6,856,748 B1 * | 2/2005 | Elkins, II ............. | G02B 6/3825 385/100 |
| 7,409,127 B1 | 8/2008 | Hurley et al. | |
| 7,668,426 B2 * | 2/2010 | Livingston ........... | G02B 6/4465 385/102 |

(Continued)

OTHER PUBLICATIONS

International Search Report and Written Opinion for PCT/US2016/015072 mailed May 24, 2016, 12 pages.

(Continued)

*Primary Examiner* — Charlie Y Peng
(74) *Attorney, Agent, or Firm* — Myers Bigel, P.A.

(57) ABSTRACT

A fiber optic cable has a cable core that includes at least one optical fiber coupled to a fiber optic connector. A cable adapter sleeve is axially mounted on the cable core to surround the cable core, the cable adapter sleeve including a body portion that has a first outer diameter and a collar that has a second outer diameter that is greater than the first outer diameter. A crush sleeve is seated within a crush groove of the collar.

20 Claims, 11 Drawing Sheets

(56) References Cited

U.S. PATENT DOCUMENTS

| | | | | |
|---|---|---|---|---|
| 7,738,759 B2* | 6/2010 | Parikh | ............... | G02B 6/4442 385/136 |
| 7,903,925 B2 | 3/2011 | Cooke et al. | | |
| 7,955,004 B2 | 6/2011 | DiMarco | | |
| 8,155,490 B2 | 4/2012 | de Jong et al. | | |
| 8,165,438 B2* | 4/2012 | Kamps | ............... | G02B 6/4486 385/102 |
| 8,221,006 B2 | 7/2012 | Theuerkorn | | |
| 8,240,927 B2* | 8/2012 | Lu | ............... | G02B 6/3887 385/100 |
| 8,267,596 B2 | 9/2012 | Theuerkorn | | |
| 8,410,909 B2* | 4/2013 | de Jong | ............... | G02B 6/3895 340/10.4 |
| 2002/0064364 A1* | 5/2002 | Battey | ............... | G02B 6/4473 385/136 |
| 2003/0044124 A1 | 3/2003 | Saitoh | | |
| 2003/0210875 A1 | 11/2003 | Wagner et al. | | |
| 2004/0126069 A1 | 7/2004 | Jong et al. | | |
| 2005/0276551 A1 | 12/2005 | Brown et al. | | |
| 2005/0281512 A1 | 12/2005 | Lutzen et al. | | |
| 2010/0092136 A1 | 4/2010 | Nhep | | |
| 2010/0209057 A1* | 8/2010 | Drouard | ............... | H02G 15/007 385/100 |
| 2011/0013871 A1 | 1/2011 | Lu et al. | | |
| 2011/0033155 A1 | 2/2011 | Daikuhara | | |
| 2011/0091169 A1 | 4/2011 | Van Der Meulen et al. | | |
| 2011/0280527 A1 | 11/2011 | Tamura | | |
| 2012/0230636 A1 | 9/2012 | Blockley et al. | | |
| 2013/0294735 A1* | 11/2013 | Burris | ............... | G02B 6/4415 385/101 |
| 2013/0336622 A1 | 12/2013 | Islam | | |

OTHER PUBLICATIONS

Extended European Search Report for EP Application No. 13804311.2, Jan. 24, 2016, 7 pages.
Kang Sung Chul, International Search Report for PCTUS1345761, Aug. 27, 2013, Korean Intellectual Property Office, Daejeon Metropolitan City, Republic of Korea.
Sung Chul Kang, International Search Report for PCT/US13/61331, Jan. 20, 2014, Daejeon Metropolitan City, Republic of Korea.
Sung Chul Kang, International Search Report for PCT/US13/61530, Jan. 16, 2014, Daejeon Metropolitan City, Republic of Korea.

* cited by examiner

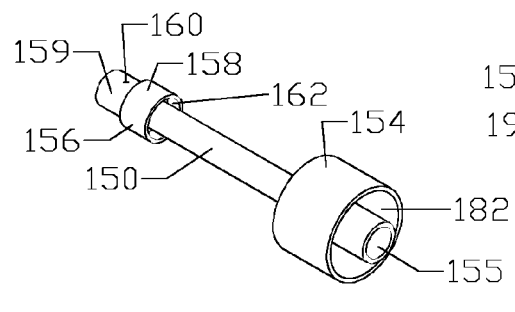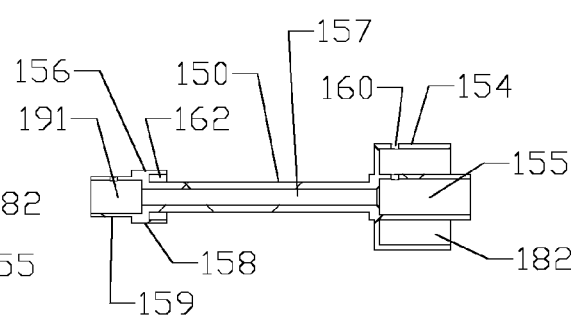
Fig. 17    Fig. 18
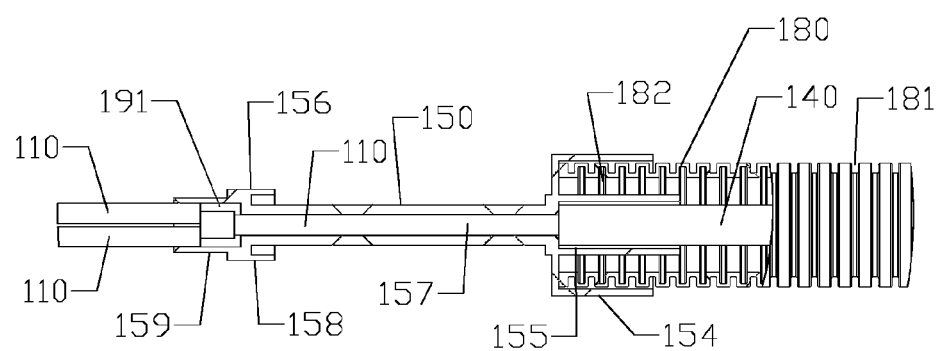
Fig. 19

UNIVERSAL REMOTE RADIO UNIT BIRD ARMORED FIBER OPTIC CABLE ASSEMBLY

BACKGROUND

Field of the Invention

This invention relates to fiber optic and hybrid electro-optical cable assemblies. More particularly, the invention relates to cable assemblies adaptable to a variety of different remote radio unit conductor entry dimensional specifications.

Description of Related Art

The wireless communications industry is changing from traditional signal delivery from ground based transceivers delivering/receiving the RF signal to/from the antenna atop the radio tower via bulky/heavy/high material cost semi-rigid metal RF coaxial cable to optical signal delivery to a tower top mounted transceiver known as a remote radio unit (RRU) or remote radio head (RRH) with implementation of fiber to the antenna (FTTA) cabling.

As this area of the market is evolving quickly, many original equipment manufacturers (OEM) are providing different RRU/RRH with different termination requirements, requiring different fiber optic cable assemblies with different cable outer diameter (OD) and breakout lengths. For example, even when the RRU/RRH are from the same OEM, the required cable assemblies may have different requirements.

One requirement may be for a shorter breakout length wherein the connectorized breakout is captive and connectorized inside a small cavity of the RRU enclosure, for example, via a rubber gland that seals only against 5 mm OD cable. Alternatively, the OD may be, for example, 6 or 7 mm and the connector connectorized with another connector that is on an outside plate of the RRU. This larger diameter OD receiving connector may also seal against the OD of the larger diameter cable.

In regions where tropical birds such as cockatoos may be present, tower mounted cable assemblies may be provided with an armoring to resist crushing or tearing damage inflicted by the powerful beaks of these birds. Providing the cables with a crush sleeve of sufficient diameter to prevent a bird from taking the cable in its beak to apply a tear or crush force may be effective for preventing beak damage. However, large diameter cable sleeving may require elaborate and therefore expensive termination assemblies such as equipment specific collars and/or gaskets to avoid leaving a bare end of the crush sleeve open for the birds to engage.

Factory terminated hybrid cable assemblies are known. Furcation tubes may be applied to fibers and or fiber bundles stripped back from the cable end to protect the optical fibers from damage between the cable and the optical fiber termination. Optical fiber furcation tubes may consist of an inner polymer tube surrounded by a para-aramid synthetic fiber sheath, or a para-aramid synthetic fiber sheath alone.

Therefore, an object of the invention is to provide optical and/or electro-optical cable solutions that overcome deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

FIG. 17 is a schematic isometric view of a furcation bore embodiment of a cable adapter sleeve.

FIG. 18 is a schematic cut-away side view of the cable adapter sleeve of FIG. 17.

FIG. 19 is a schematic partial cut-away close-up view of the cable adapter sleeve of FIG. 17, installed upon a cable core that is furcated in the furcation bore.

DETAILED DESCRIPTION

The inventor has recognized that it is time consuming, hazardous and expensive to install new cable assemblies on a tall radio tower. A single user may utilize different types of RRU/RRH. To avoid duplication of incompatible assemblies and simplify sourcing for the user, a single solution that can be used with multiple types of RRU/RRH has been devised. Thereby, should the rapidly evolving RRU/RRH technology adopt one or the other interconnection/sealing interfaces as a standard and/or the user select the alternative RRU/RRH in the future, the RRU/RRH may be easily exchanged in the future without also requiring exchange of the entire cable assembly.

These cable assemblies may include adapter sleeves which include a plurality of differently dimensioned outer diameter surfaces and other features, to allow the same cable assembly to be used with a variety of different RRU/RRHs, despite the differences in connection mechanisms on these various different RRU/RRHs.

Figure 1:
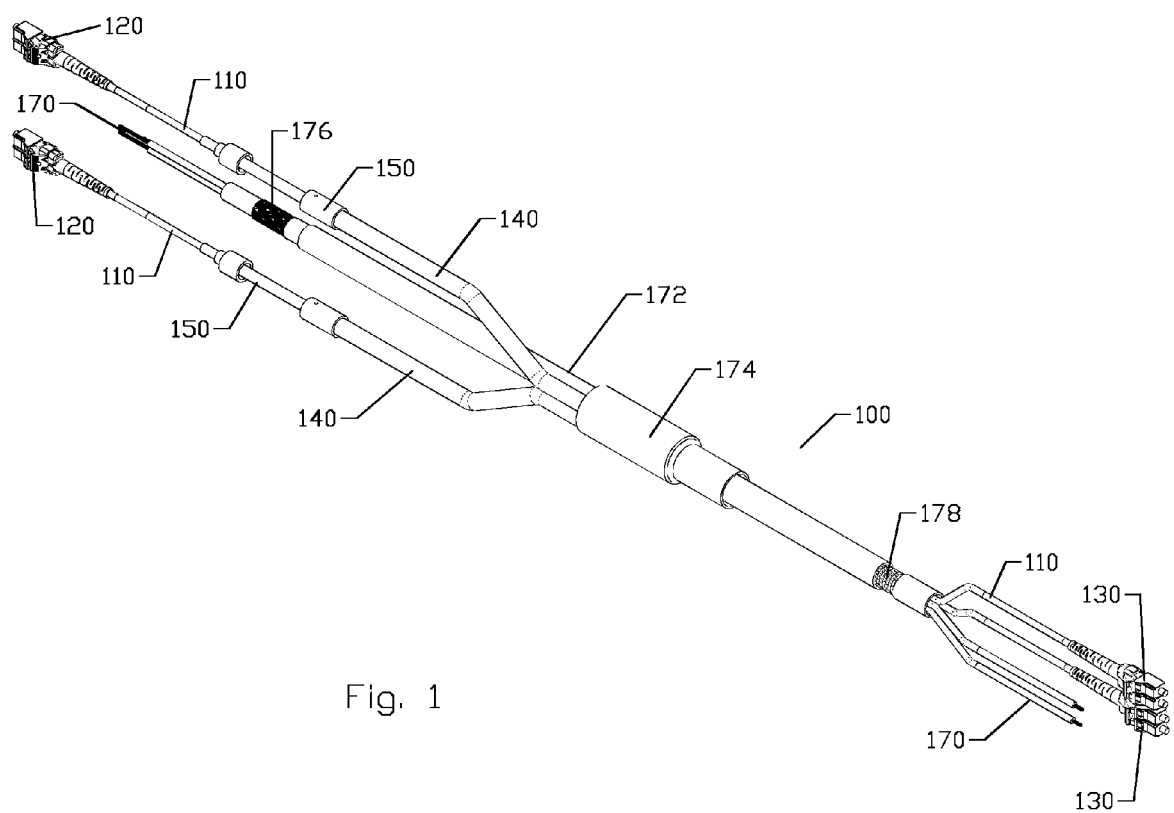
FIG. 1 is a schematic isometric view of an exemplary cable assembly.

A fiber optic cable 100, for example as shown in FIG. 1, includes a pair of cable cores 110 that each include a first and a second optical fiber 112. A first fiber optic connector 120 and a second fiber optic connector 130 are provided at respective ends of each of the cable cores 110. A portion of each cable core 110 may be protected by a protective armor tube 140. It is the respective armor tubes 140 that are sealed against by the environmental seals of the RRU/RRHs.

The first and second optical fibers 112 may be single mode optical fibers, multi-mode optical fibers, etc. The first and second optical fibers 112 may be 900 micron buffered or 250 micron buffered optical fibers. The cable core 110 may be a loose tube cable, a ribbon cable or any other appropriate core configuration. In other words, the cable core 110 may be any suitable fiber optic cable core and, as discussed herein, may also include other elements such as one or more metal electrical conductors. In the exemplary embodiment demonstrated by FIG. 1, the first and second optical fibers 112 comprise buffered single mode optical fibers that run adjacent to each other in the cable core 110. Alternatively, the fibers may be single fiber strands. At the first end of the cable 100, the first and second optical fibers 112 split apart from each other at a first optical connector 120 provided as a duplex LC connector. In the depicted embodiment, each buffered optical fiber 112 may have an outer diameter of about 0.9 mm, although other sized optical fibers may be used. One of the optical fibers 112 may be used to carry signals that are to be transmitted from the antenna associated with the RRU/RRH while the other of the optical fibers 112 may be used to carry signals that are received at the antenna to the remainder of the base station equipment.

The first and second fiber optic connectors 120, 130 may each comprise any appropriate fiber optic connector including, for example, an LC, SC, or MPO connector. In the depicted embodiment, the first and second fiber optic connectors 120, 130 are each implemented as a duplex LC connectors.

The protective armor tube 140 may comprise, for example, a polyethylene tube having an outer diameter of, for example, between about 6 mm and about 12 mm. In some embodiments, the outer diameter of the protective armor tube 140 may be sized to be received within a cable clamp that is provided on at least one of the RRU/RRHs with which the cable 100 is to be used. As will be discussed in further detail below, some RRU/RRHs such as, for example, a RRU-S01 manufactured by Ericsson Inc., Plano Tex., may have a gland that covers the fiber optic connector port on the RRU/RRH. This gland may provide an environmental sealing function (e.g., to reduce or prevent water or moisture ingress into the connector port area and/or into the RRU/RRH) and may also provide a strain relief function to prevent the cable 100 or the connector port on the RRU from being damaged if a pulling force is applied to the cable 100. The above referenced gland on the RRU may have a clamp that is designed to receive a certain diameter cable in order to provide the strain relief functionality. Thus, the protective armor tube 140 may have a diameter (e.g., about 6 mm to about 12 mm) that is designed to fit within the strain relief clamp on the gland of the RRU. The protective armor tube 140 may also provide enhanced protection to the optical fibers 112, 114 in the section of the cable 100 that is at the top of the tower where the RRU may be located, which is a portion of the cable 100 that may be more susceptible to being damaged.

Figure 2:
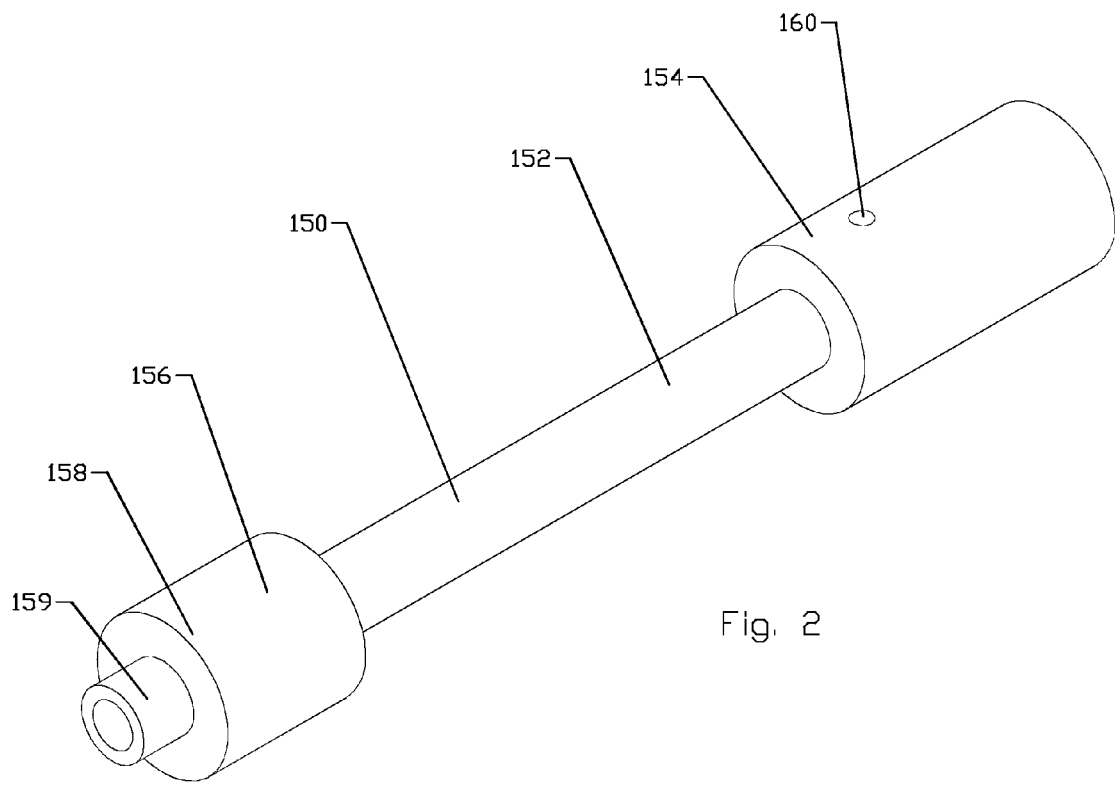
FIG. 2 is a schematic isometric view of an exemplary cable adapter sleeve.
Figure 3:
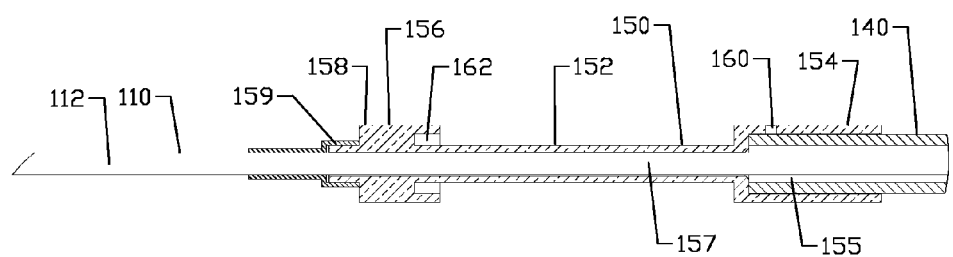
FIG. 3 is a schematic cut-away side view of the cable adapter sleeve of FIG. 2 installed upon a cable core with an armor tube.

A cable adapter sleeve 150, for example as shown in FIG. 2, is provided positioned axially on the cable 100. The cable adapter sleeve 100 may serve multiple functions including, for example, providing a different outer diameter in the region of the cable 100 adjacent the connector 120 that may be used to mate the cable 100 with additional types of RRU/RRHs. The cable adapter sleeve 150 may also perform a strain relief function. As shown best in FIG. 2, the cable adapter sleeve 150 includes a body portion 152, a collar 154 and a stop 156. The cable core 110 extends through all three of the body portion 152, the collar 154 and the stop 156. The collar 154 extends from the rear end of the body portion 152. The collar 154 may be formed integrally with the body portion 152 or as a separate piece that is attached to the body portion 152. As best shown in FIG. 3, the collar 154 is fitted over one of the protective armor tube 140. The stop 156 extends from the other (front) end of the body portion 152. The stop 156 may also be formed integrally with the body portion 152 or as a separate piece that is attached to the body portion 152. The first and second optical fibers 112 extend all of the way through the stop 156 for insertion into the respective boots of the dual-boot duplex LC connector 120. The cable adapter sleeve 150 may comprise, for example, a polymer sleeve, a metal sleeve or a combination thereof.

The cable adapter sleeve 150 may be formed as a unitary single-piece adapter sleeve. The cable adapter sleeve 150 may be formed, for example, by injection molding, machining or any other appropriate manufacturing process, including in situ overmolding molding of materials such as TPE or silicon, around the cable core and an end of the protective armor tube 140. The cable adapter sleeve 150 may be generally cylindrical, with several separate portions of different circular cross-section diameters. The central body portion 152 may have a relatively small cross-sectional outer diameter, for example, of about 5 mm. The collar 154 may have a larger cross-sectional outer diameter, which in the depicted embodiment is about 12 mm, which allows the collar 154 to fit over the end of the protective armor tube 140 which has an outer diameter of about 10 mm. The stop 156 is a "two step" stop that has two different cross-sectional outer diameters: namely, a cross-sectional outer diameter of about 11 mm for the larger step 158 and a cross-sectional outer diameter of about 5 mm for the smaller step 159. Some RRU/RRHs include a rubber gasket that covers and protects the fiber optic connector port on the RRU/RRH, and thus it is necessary to insert the end of the cable 100 that includes fiber optic connector 120 through this rubber gasket to be received within the fiber optic connector port on the RRU/RRH. The increased cross-sectional outer diameters of the stop 156 may engage a back surface of the rubber gasket in order to function as a strain relief mechanism that resists axial forces that may otherwise pull the fiber optic connector 120 out of the mating fiber optic connector port on these RRU/RRHs.

The body portion 152 of cable adapter sleeve 150 is a tubular body that has a central passageway 153 that the first and second optical fibers 112 extend through. The collar 154 likewise has a tubular shape, but the central passageway 155 of the collar 154 may have a significantly larger internal diameter that may be sized, for example, to receive an end of the protective armor tube 140. An adhesive may be coated onto the outside of the protective armor tube and/or onto the interior surface of the passageway 155 in order to bond the protective armor tube 140 within the passageway 155 of the collar 154. The collar 154 may also include an aperture 160 that may receive a protrusion that is included on the gaskets that are included on some RRU/RRHs. By inserting this protrusion into the aperture 160, an improved seal and/or improved strain relief may be provided. The stop 156 may have an internal passageway 157 that is, for example, the same diameter as the internal passageway 153 of the body portion 152.

The outer diameter of the collar 154 may, in some embodiments, be sized to fit within a clamp for one or more different types of RRU/RRHs. For example, an RRU that is manufactured by Alcatel-Lucent, Murray Hill, N.J., has a clamp that is sized to receive a cable having an outer diameter of about 12 mm. The increased outer diameter of the collar 154 may be sized to fit within the clamp on the Alcatel-Lucent RRU so that the cable 100 may be properly connected to the Alcatel-Lucent RRU with full sealing and strain relief protection.

The outer diameter of the body portion 152 may, in some embodiments, be sized to fit a gasket or other aperture that provides access to the connector port on other types of RRU/RRHs. For example, the RRU-S11 and RRU-S12 RRU that are manufactured by Ericsson each include a gasket that is sized to receive a cable having an outer diameter of about 5 mm. The stop 156 may be passed through this gasket and may contact a back side of the gasket (i.e., the side of the gasket facing the RRU). The increased outer diameter of the stop 156 may be sufficiently large that it may be difficult to pull the collar through the gasket, and hence the stop 156 may perform a strain relief function for the cable 100 when the fiber optic connector 120 of cable 100 is received within a fiber optical connector port on either of the Ericsson RRU-S11 or RRU-S12 RRU. The body portion 152 may have an outer diameter that allows the gasket to properly perform its sealing function.

Figure 4:
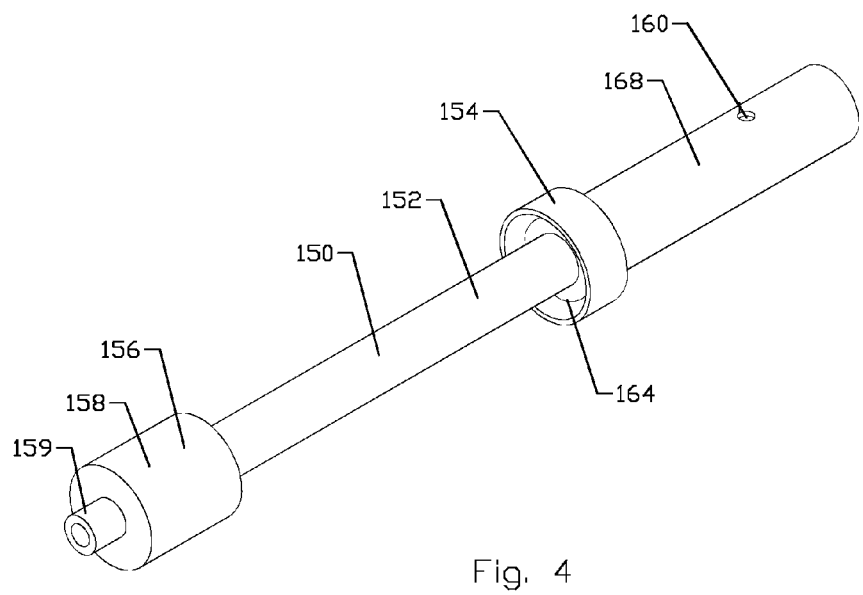
FIG. 4 is a schematic isometric view of an alternative cable adapter sleeve.
Figure 5:
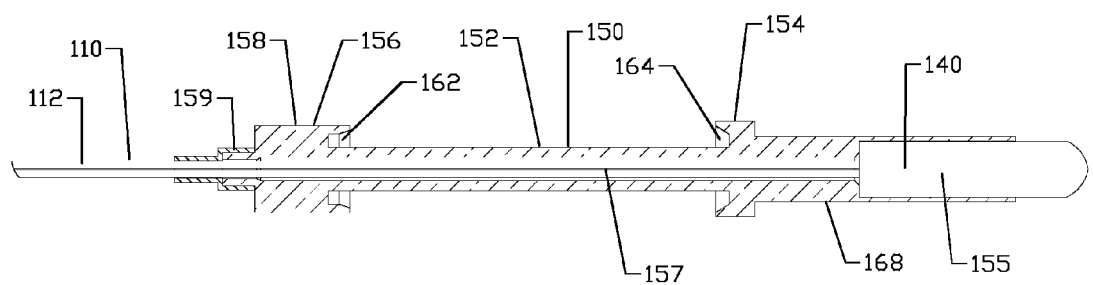
FIG. 5 is a schematic cut-away side view of the cable adapter sleeve of FIG. 5 installed upon a cable core with an armor tube.
Figure 6:
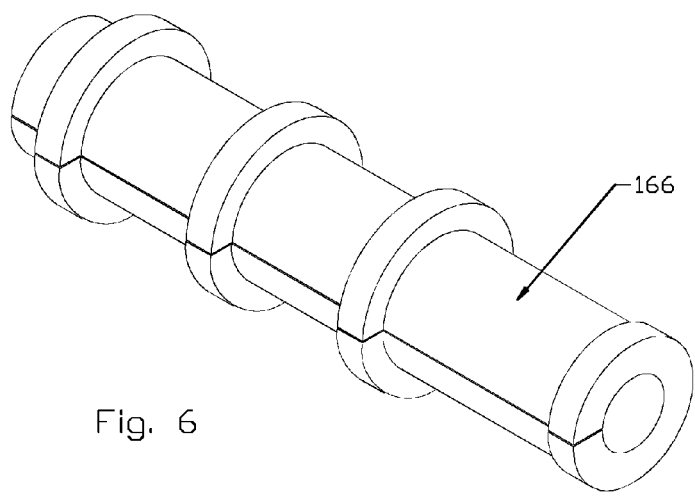
FIG. 6 is a schematic isometric view of an RRU gasket.
Figure 7:
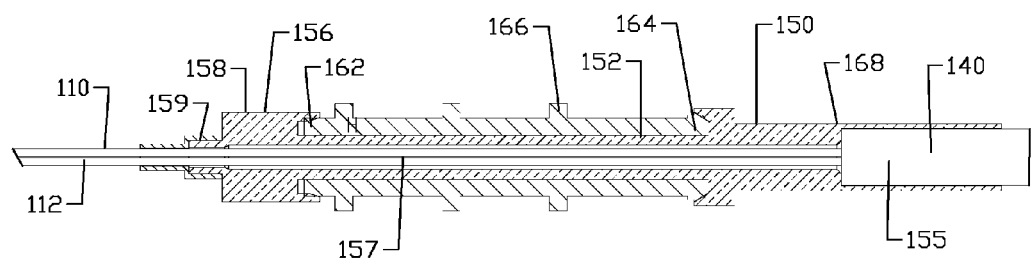
FIG. 7 is a schematic cut-away side view of the RRU gasket of FIG. 6, seated upon the cable adapter and cable core of FIG. 5.
Figure 8:
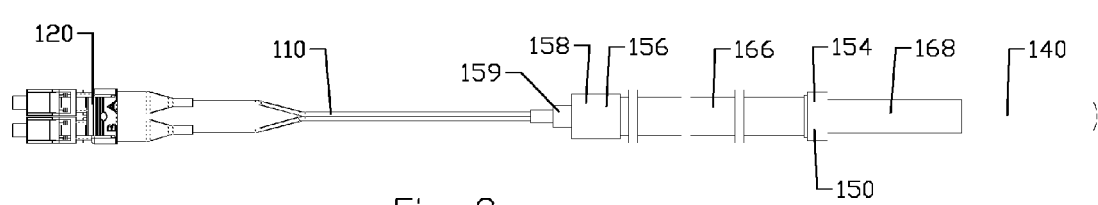
FIG. 8 is a schematic side view of a cable end corresponding to FIG. 7.

As best shown in FIG. 3, a first annular groove 162 of the stop 156, open to the body portion 152, may be provided as a seat of an end of the gasket, for retaining the gasket immediately prior to mating with the RRU/RRH. In further embodiments, for example as shown in FIGS. 4 and 5, a second annular groove 164 of the collar 154, open to the body portion 152, may be applied, for improved gasket retention. The first and/or second annular grooves 162, 164 may be provided as a straight or tapered bore. Thereby, a gasket 166, for example as shown in FIG. 6, may be applied and retained by the first and second annular grooves 162, 164 as shown for example in FIGS. 7 and 8.

Figure 9:
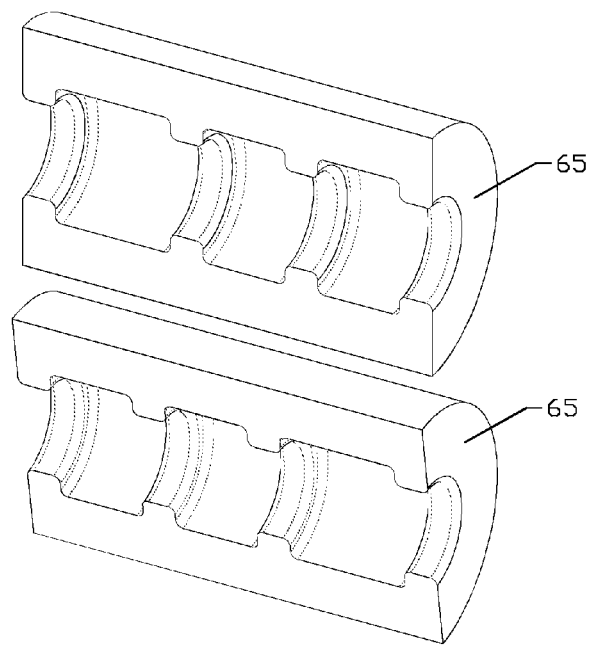
FIG. 9 is a schematic isometric view of an alternative RRU gasket.
Figure 10:
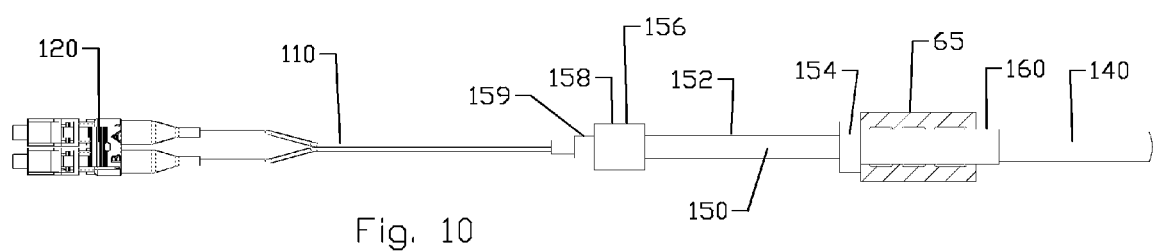
FIG. 10 is a schematic partial cut-away side view of the gasket of FIG. 9 seated upon a cable adapter and cable core.
Figure 11:
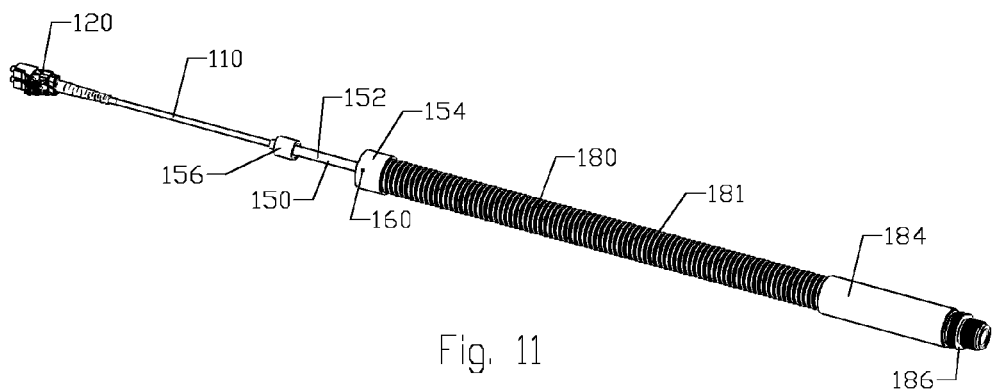
FIG. 11 is a schematic isometric view of an exemplary cable assembly with a crush sleeve.
Figure 12:
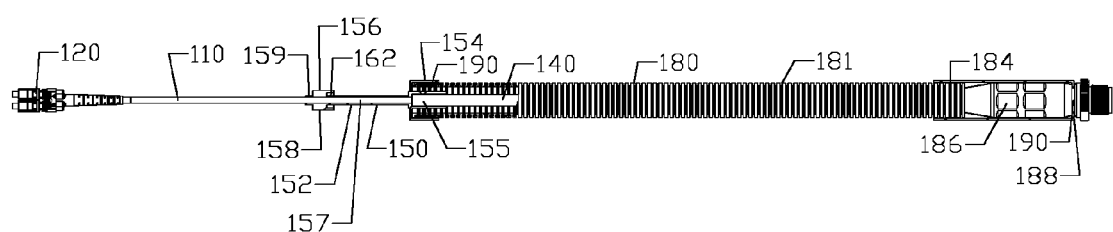
FIG. 12 is a schematic partial cut-away side view of the cable assembly of FIG. 11.
Figure 13:
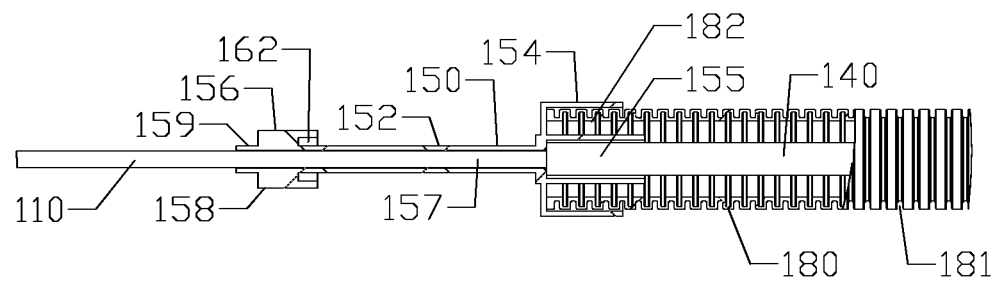
FIG. 13 is a schematic close-up view of the cable adapter sleeve portion of FIG. 12.

Alternatively, as shown in FIGS. 9 and 10, the collar 154 may also be provided with a gasket seat 168 at a cable end, provided with a diameter greater than the body portion 152 but less than the collar 154. Thereby a gasket 166 dimensioned to seat against the gasket seat 168 has a shoulder provided by the collar 154, operative again as a stop shoulder, preventing axial movement of the cable adapter sleeve 150 and thus the attached armor tube 140 out of the RRU/RRH when tension is applied from the cable end.

In the depicted embodiment, the axial cross-sections through the body portion 152, collar 154 and stop 156 are all substantially circular cross-sections, which facilitates inserting these portions of the cable adapter sleeve 150 within different clamps, gaskets and the like on commercially available RRU/RRHs so that proper sealing and strain relief may be provided when the cable 100 is connected to various of these RRU/RRHs. It will be appreciated, however, that other cross-sectional diameters may alternatively be used, particularly if appropriate for the clamp and gasket designs (and/or the designs of other features) on these RRU/RRHs.

Thus, as discussed above, it will be appreciated that the cable adapter sleeve 150 includes multiple sections having different cross-sectional outer diameters that may be received within different sized clamps, gaskets and the like on RRU/RRHs in order to facilitate using the cable 100 with a variety of different RRU/RRHs. The cable adapter sleeve 150 may be located adjacent the fiber optic connector 120 so that it will properly mate with the different sealing, clamping and/or strain relief components on the various RRU/RRHs. For example, in some embodiments, the front portion of the cable adapter sleeve (i.e., the portion of the cable adapter sleeve 150 that includes the stop 156) may be in the range of about 80 mm to about 350 mm from the front of the fiber optic connector (which is the forward most part of cable 100). The body portion 152 may need to have a minimum length so that the body portion 152 will properly fit through the aperture in the gaskets provided on various RRU/RRHs.

In further embodiments, for example as shown in FIGS. 11-14 and 23-24, the cable core 110 and armor tube 140 may be further protected by inserting the armor tube 140 within a crush sleeve 180 of sufficient diameter to protect against damage from crushing or tearing by bird beaks. In particular, while other diameters may be appropriate for the specific bird species common to the region where the installation occurs, a diameter of at least 19 millimeters has been demonstrated as effective for preventing beak damage from cockatoos. Because the crush sleeve 180 is dimensioned to be too large for the bird to place its beak around, the crush sleeve 180 may not be required to have a strength characteristic sufficient to withstand the full potential crush force of the bird beak, enabling the crush sleeve 180 to be formed from cost and weight-efficient materials, such as polymer tubing. To improve the bend radius of the crush sleeve 180, the crush sleeve 180 may be provided with annular or helical corrugations 181.

Figure 14:
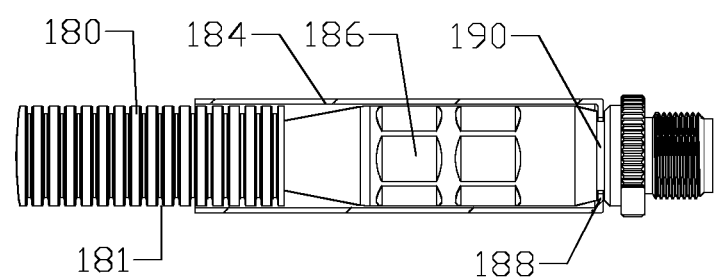
FIG. 14 is a schematic close-up view of the sleeve seat portion of FIG. 12.

The crush sleeve 180 may be coupled to the cable adapter sleeve 150 via insertion within an annular crush groove 182 provided in the collar 154. The other end of the crush sleeve 180 may be terminated without accessible edges of the crush sleeve 180, for example, via insertion into a cylindrical sleeve seat 184, the sleeve seat 184 surrounding the desired connection interface 186, demonstrated in FIGS. 11, 12, 14 and 23 as an ODC-type fiber optic connector. As best shown in FIG. 14. the sleeve seat 184 may key with the connection interface 186, for example via an inward projecting lip 188 which seats within a seal groove 190 provided on an outer diameter of the connection interface 186.

Figure 15:
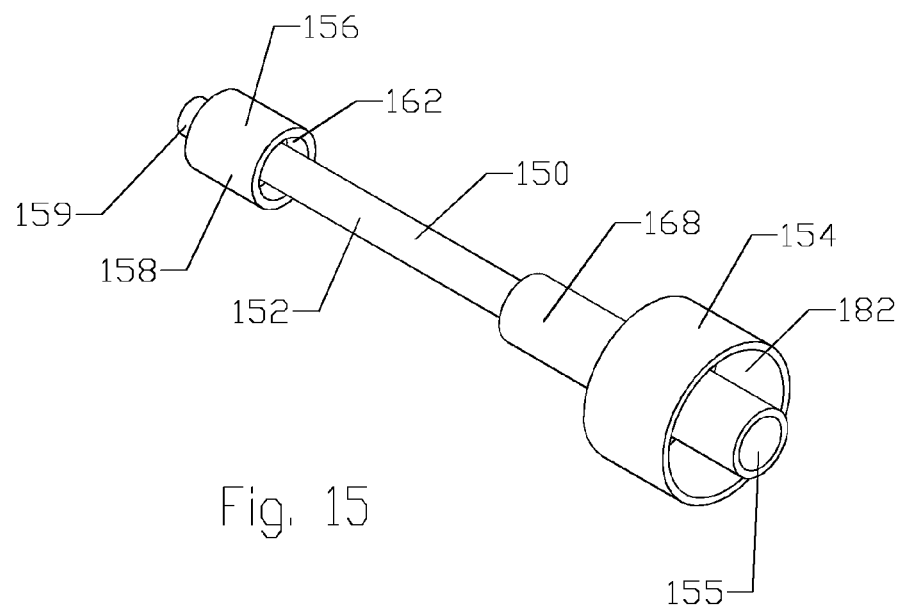
FIG. 15 is a schematic isometric view of an alternative embodiment cable adapter sleeve.
Figure 16:
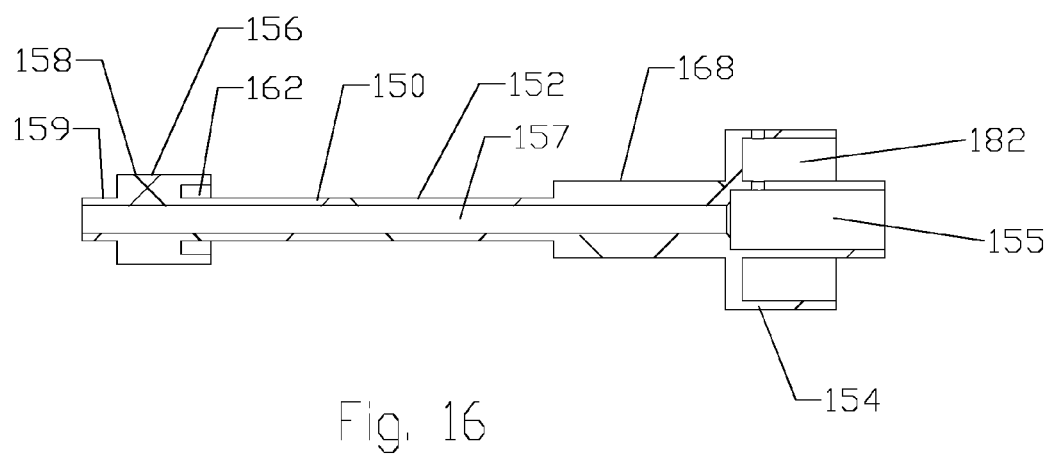
FIG. 16 is a schematic cut-away side view of the cable adapter sleeve of FIG. 15.
Figure 20:
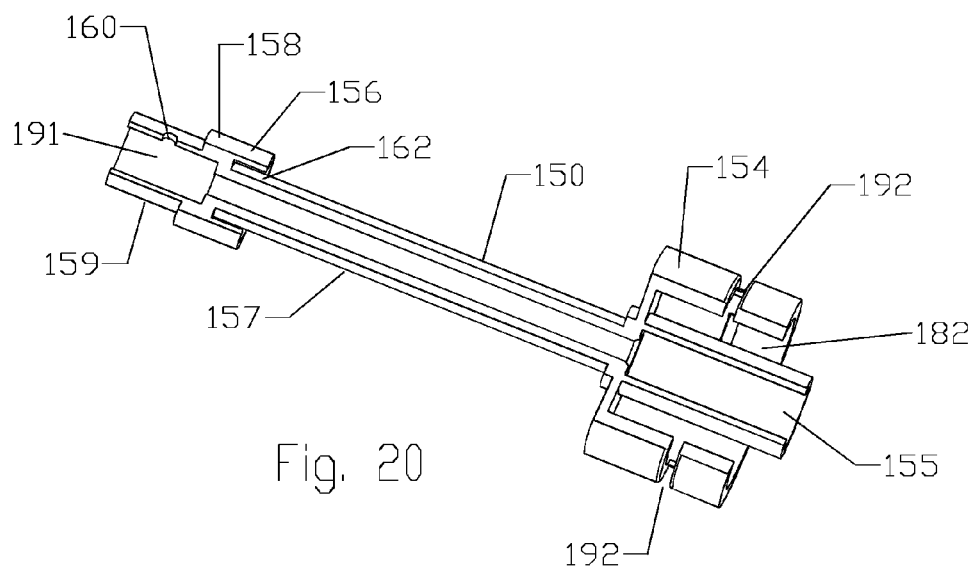
FIG. 20 is a schematic isometric partial cut-away view of cable adapter sleeve embodiment for slot and clip crush sleeve retention.
Figures 21, 22:
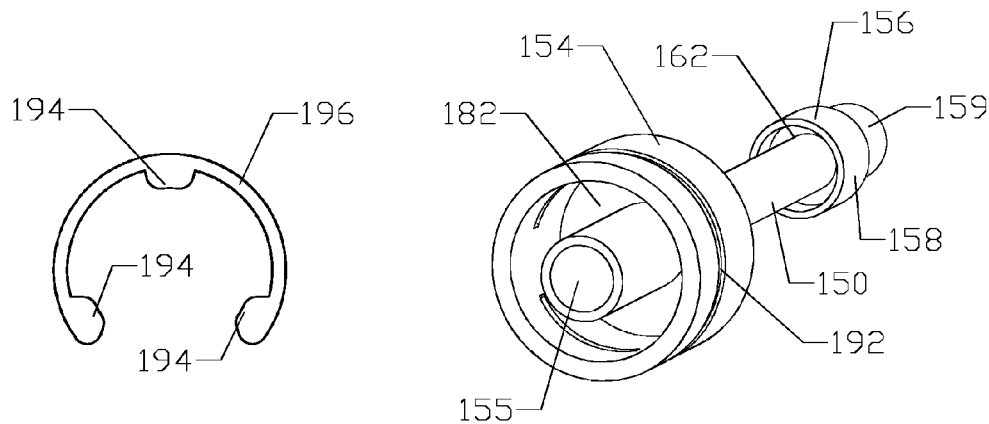
FIG. 21 is a schematic side view of a clip for use with the cable adapter sleeve of FIG. 20.
FIG. 22 is a schematic isometric cable end view of the cable adapter sleeve of FIG. 20.
Figure 23:
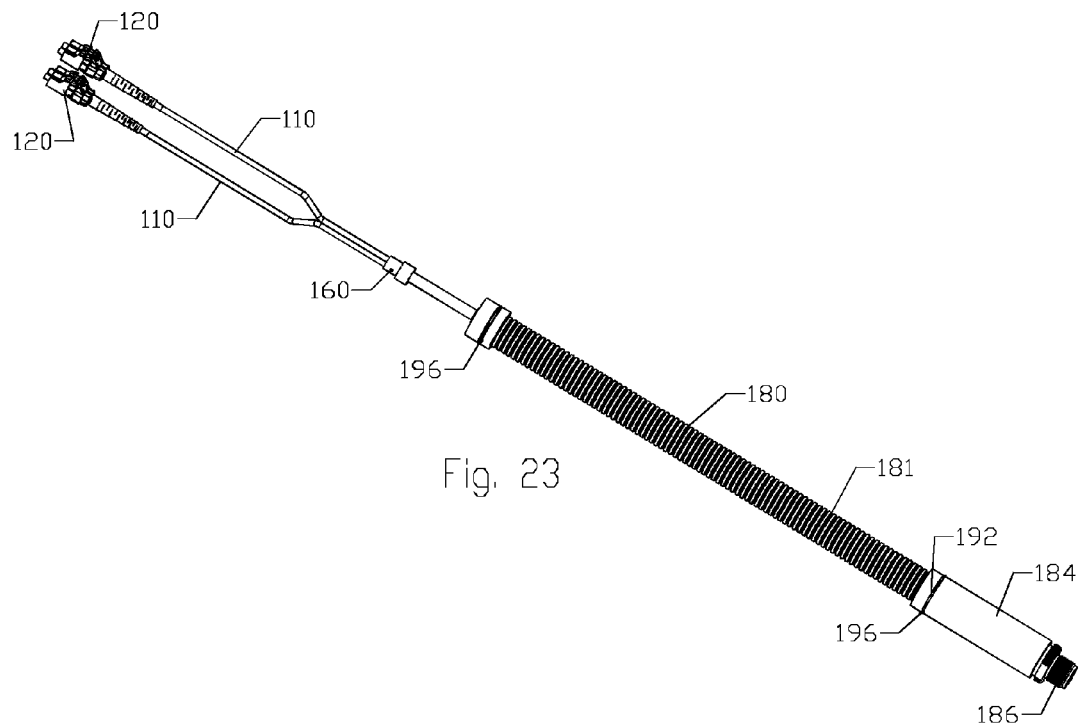
FIG. 23 is a schematic isometric view of a cable assembly with slot and clip crush sleeve retention.
Figure 24:
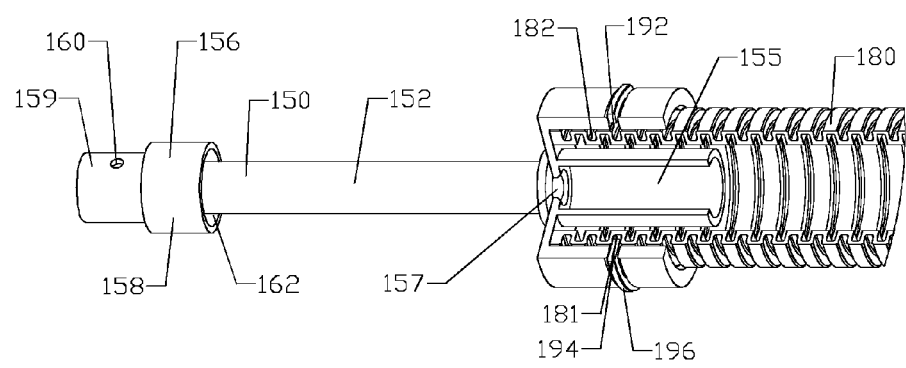
FIG. 24 is a schematic isometric partial cut-away side view of the cable adapter sleeve of FIG. 20 seated upon a crush sleeve, retained by the clip of FIG. 21.

In embodiments with a crush sleeve 180 seated in the crush groove 182, the outer surface of the collar 154 also utilized for the gasket seat 168 may have an incompatible diameter. To provide the functionality of a gasket seat 168 in addition to the crush sleeve 180, the gasket seat 168 may be provided forward of the collar 154, for example as shown in FIGS. 15 and 16.

The cable adapter sleeve 150 may also be provided with a furcation bore 191 at the connector end of the internal passageway 157, for example as shown in FIGS. 18-20 and 23, for seating/encapsulating a furcation of optical fibers 112 from the cable core 110 into separate first optical connectors 120. The furcated ends of the cable core seated in the furcation bore 191 may be encapsulated via, for example, epoxy and/or adhesive injection through an aperture 160.

Because the cable core 110 and/or armor tube 140 remains sealed via insertion into the central passageway 155 at one end and at the selected termination at the other end of the assembly, a fully environmentally sealed termination of the crush sleeve 180 may not be required at each end. As such the coupling between the crush sleeve 180 and the cable adapter sleeve 150 and/or at the other end of the assembly may be free floating within the respective crush groove 182 and/or sleeve seat 184. Alternatively, adhesives and/or sealants may be applied, for example by injection through an aperture 160 of the collar 154 which opens into the crush groove 182.

An embodiment demonstrating an unsealed mechanical retention of the coupling between the crush sleeve 180 and the cable adapter sleeve 150 is shown in FIGS. 20-24. The outer diameter of the collar 154 may be provided with a plurality of slots 192 dimensioned to receive inward projections 194 of a clip 196. Upon seating the clip 196 upon the slots 192, the inward projections 194 extend into the crush groove 182 to key with the corrugations 181 of the crush sleeve 180, longitudinally interlocking the crush sleeve 180 with the cable adapter sleeve 150. A slot and clip retention with the corrugations 181 of the crush sleeve 180 may also be applied between the sleeve seat 184 and crush sleeve 180, as shown for example in FIG. 23.

One skilled in the art will appreciate that the crush sleeve 180 termination into the crush groove 182 provides a circumferential seat for the crush sleeve 180 that does not leave an edge of the crush sleeve end accessible to bird beaks. However, the cable adapter sleeve 150 is still suitable for sealing against the small diameter openings of the various RRU/RRHs.

To prevent the transition from the oversized diameter of the collar 154 to the relatively small diameter of the body portion 152 from becoming a weak point of the armored fiber optic cable assembly, the cable adapter sleeve 150 may be provided formed from a material with suitably increased strength characteristics, such as fiber reinforced plastic or metal.

Returning to FIG. 1, one skilled in the art will appreciate that the cable adapter sleeves 150 may be applied to a single fiber conductor cable or to multiple armor tubes 140 of a multi-conductor cable which may include a plurality of optical cable cores 110 to be separately terminated. The multi-conductor cable may further include electrical conductors 170, the electrical conductors 170 provided with a shielded furcation tube 172 and a shield layer to multi-conductor cable shield interconnection at a transition housing 174 where the cable cores 110 are also broken out into their respective armor tubes 140. Shielded furcation tubes 172 and interconnections between the shield layer 176 of the shielded furcation tube 172 and the shield 178 of the multi-conductor cable are disclosed in detail in commonly owned U.S. patent application Ser. No. 13/791,248, "Shielded Electrical Conductor Furcation Assembly", filed 8 Mar. 2013 by Nahid Islam, hereby incorporated by reference in its entirety. The number of optical and/or electrical conductors present in the may be selected as desired, according to the intended installation.

While the cables and cable adapter sleeves according to embodiments of the present invention have primarily been discussed above with respect to their use on RRU/RRHs, it will be appreciated that there may be other applications such as enclosure units and the like in which the fiber optic cables and cable adapter sleeves according to embodiments of the present invention may be used in order to provide universal cables that may be used with multiple of such units that have different cable clamping, sealing and/or strain relief designs.

One skilled in the art will appreciate that the application of the cable adapter sleeve enables a single cable assembly to be used with a wide range of RRU/RRH equipment, enabling simplified cable assembly manufacture, inventory, procurement and/or field exchange of equipment.

| Table of Parts | |
|---|---|
| 100 | cable |
| 110 | cable core |
| 112 | optical fiber |
| 120 | first optical connector |
| 130 | second optical connector |
| 140 | armor tube |
| 150 | cable adapter sleeve |
| 152 | body portion |
| 154 | collar |
| 155 | passageway |
| 156 | stop |
| 157 | internal passageway |
| 158 | larger step |
| 159 | smaller step |
| 160 | aperture |
| 162 | first annular groove |
| 164 | second annular groove |
| 166 | gasket |
| 168 | gasket seat |
| 170 | electrical conductor |
| 172 | shielded furcation tube |
| 174 | transition housing |
| 176 | shield layer |
| 178 | shield |
| 180 | crush sleeve |
| 181 | corrugation |
| 182 | crush groove |
| 184 | sleeve seat |
| 186 | connection interface |
| 188 | lip |
| 190 | seal groove |
| 191 | furcation bore |
| 192 | slot |
| 194 | inward projection |
| 196 | clip |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. An armored fiber optic cable mateable with a plurality of remote radio unit configurations, comprising:
   a cable core that includes at least one optical fiber;
   a fiber optic connector that receives the at least one optical fiber;
   a monolithic cable adapter sleeve seated upon the cable core;

the cable adapter sleeve including a body portion that has a first outer diameter and a collar that has a second outer diameter which is greater than the first outer diameter;

an armor tube seated upon the cable core having a fourth outer diameter that is greater than the first outer diameter but less than the second outer diameter, the armor tube coupled to an internal passageway of the collar; and a crush protection sleeve surrounding the armor tube having a fifth outer diameter that is greater than the fourth outer diameter, the crush protection sleeve coupled to a groove of the collar.

2. The fiber optic cable of claim 1, further including a stop on the cable adapter sleeve that has a third outer diameter that is greater than the first outer diameter.

3. The fiber optic cable of claim 2, further including a first annular grove provided in the stop, the first annular groove open to the body portion.

4. The fiber optic cable of claim 2, wherein the stop, the body portion and the collar have circular cross-sections.

5. The fiber optic cable of claim 1, wherein an outer diameter of the crush protection sleeve is at least 19 millimeters.

6. The fiber optic cable of claim 1, further including a second annular groove provided in the collar, the second annular groove open to the body portion.

7. The fiber optic cable of claim 1, wherein the collar includes an aperture extending between an outer diameter of the collar and a passageway of the collar.

8. The fiber optic cable of claim 1, wherein the collar has a gasket seat at a cable end that has a fourth outer diameter which is greater than the first outer diameter and less than the second outer diameter.

9. The fiber optic cable of claim 1, wherein the first outer diameter of the body portion of the cable adapter sleeve is sized to sealingly fit within a gasket on a second remote radio unit.

10. The fiber optic cable of claim 1, wherein the second outer diameter of the collar of the cable adapter sleeve is configured to be received within a clamping structure of a third remote radio unit.

11. The fiber optic cable of claim 1, wherein the fiber optic cable further includes at least one electrical conductor.

12. The fiber optic cable of claim 1, wherein a front of the fiber optic connector is positioned between about 80 mm and about 350 mm from a front of the collar of the cable adapter sleeve.

13. A method for manufacturing an armored fiber optic cable mateable with a plurality of remote radio unit configurations, comprising:

providing a cable core that includes at least one optical fiber;

coupling a fiber optic connector to the at least one optical fiber;

mounting a monolithic cable adapter sleeve axially on the cable core, the cable adapter sleeve including a body portion that has a first outer diameter and a collar that has a second outer diameter greater than the first outer diameter;

coupling an armor tube to an internal passageway of the collar, the armor tube provided with a fourth outer diameter that is greater than the first outer diameter but less than the second outer diameter; and providing a crush protection sleeve surrounding the armor tube; the crush protection sleeve provided with a fifth outer diameter that is greater than the fourth outer diameter, the crush protection sleeve coupled to a groove of the collar.

14. The method of claim 13, wherein the crush protection sleeve is coupled to the groove by inserting an inward projection of a clip through a slot of the collar so that the inward projection keys with a corrugation of the crush protection sleeve.

15. The method of claim 13, wherein the cable adapter sleeve further includes a stop that has a third outer diameter that is greater than the first outer diameter.

16. The method of claim 13, wherein the cable adapter sleeve is mounted by overmolding the cable adapter sleeve upon an outer diameter of the cable core.

17. The method of claim 13, wherein the cable adapter sleeve is mounted by passing the cable core through a passageway of the cable adapter sleeve and gluing the cable adapter sleeve at a desired axial position onto an outer diameter of the cable core.

18. The method of claim 13, wherein the cable adapter sleeve is mounted such that a front of the fiber optic connector is positioned between about 80 mm and about 350 mm from a front of the collar of the cable adapter sleeve.

19. The method of claim 13, further including at least one electrical conductor in the cable.

20. The method of claim 13, wherein the cable adapter sleeve is formed of a metal material.

* * * * *